(12) United States Patent
Myers

(10) Patent No.: US 7,567,777 B2
(45) Date of Patent: Jul. 28, 2009

(54) APPARATUS AND METHOD FOR EFFECTING COMMUNICATION BETWEEN A WIRELESS NETWORK AND A SATELLITE RADIO RECEIVER

(75) Inventor: Stephen R. Myers, Allen, TX (US)

(73) Assignee: RadioShack Corporation, Fort Worth, TX (US)

( * ) Notice: Subject to any disclaimer, the term of this patent is extended or adjusted under 35 U.S.C. 154(b) by 564 days.

(21) Appl. No.: 11/413,664

(22) Filed: Apr. 29, 2006

(65) Prior Publication Data
US 2006/0199529 A1   Sep. 7, 2006

(51) Int. Cl.
*H04H 1/00* (2006.01)
(52) U.S. Cl. .................. 455/3.02; 455/557; 455/12.1
(58) Field of Classification Search ............. 455/3.02, 455/12.1, 552.1, 3.06, 351, 423, 67.11, 414, 455/556, 427, 557, 433, 435, 445, 466, 550; 370/312, 401
See application file for complete search history.

(56) References Cited

U.S. PATENT DOCUMENTS

| | | | |
|---|---|---|---|
| 6,259,891 B1 * | 7/2001 | Allen | 455/3.02 |
| 6,314,094 B1 | 11/2001 | Boys | 370/352 |
| 6,430,233 B1 * | 8/2002 | Dillon et al. | 375/316 |
| 6,618,585 B1 * | 9/2003 | Robinson | 455/3.02 |
| 2005/0201360 A1 | 9/2005 | Redstone | 370/352 |
| 2005/0213526 A1 * | 9/2005 | Malkemes et al. | 370/312 |
| 2006/0063520 A1 * | 3/2006 | Fratti et al. | 455/423 |
| 2006/0094349 A1 * | 5/2006 | Slesak et al. | 455/3.02 |
| 2008/0163049 A1 * | 7/2008 | Krampf | 715/700 |
| 2008/0176510 A1 * | 7/2008 | Yuhara et al. | 455/3.02 |
| 2008/0216126 A1 * | 9/2008 | Perlman | 725/64 |

OTHER PUBLICATIONS

"Mar. 23, 2004; Wi-Fi goes mobile!—Review of the Omnifi DMP1 Digital Media Player" by Leslie Shapiro; www.crutchfield.com; Oct. 13, 2005.
"Tao WIFIMP1 WiFi Digital Audio Player—20GB"; www.digital-lyunique.com; Oct. 13, 2005.

* cited by examiner

*Primary Examiner*—Tan Trinh
(74) *Attorney, Agent, or Firm*—Law Office of Donald D. Mondul

(57) ABSTRACT

An apparatus for effecting communication between a wireless network and a coupled satellite radio receiver includes: (a) a wireless receiver for receiving at least one local signal associated with the wireless network; (b) a coupler for coupling the satellite radio receiver with the apparatus; and (c) a controller coupled with the wireless receiver and with the coupler. The control unit cooperates with the wireless receiver to ascertain presence of a local signal. The controller cooperates with the wireless receiver and the satellite radio receiver to ascertain whether a satellite signal received by the satellite receiver has a predetermined relationship with the local signal. When the satellite signal has the predetermined relationship with the local signal, the controller and the satellite radio receiver cooperate to provide signaling to the satellite radio receiver using the local signal.

20 Claims, 3 Drawing Sheets

APPARATUS AND METHOD FOR EFFECTING COMMUNICATION BETWEEN A WIRELESS NETWORK AND A SATELLITE RADIO RECEIVER

BACKGROUND OF THE INVENTION

The present invention is directed to reception of satellite radio programming and especially to reception of satellite radio programming where satellite signal reception is degraded. Satellite radio receivers operate acceptably in outside localities where few obstacles exist in a line-of-sight between the receiver antenna and the satellite transmitter antenna. However, when one locates a satellite radio receiver, such as a portable satellite radio receiver, in a more obstructed locality, such as inside a building, reception quality may be significantly degraded.

One solution to overcome such degradation of reception is to locate the portable satellite radio receiver near a window or other access to satellite signals extant outside the obstructed locality. Another solution to overcome degradation of reception is to provide a satellite receiving antenna located externally of the obstructed locality and feed received signals via cable or similar connection to the portable satellite radio receiver within the obstructed locality. These prior solutions are disadvantageous because they restrict where one may locate a portable satellite radio receiver within an obstructed locality to achieve acceptable reception of programming.

Another solution that has been provided by the satellite programming originators has been to transmit satellite programming via the Internet or other wide area network (WAN), preferably substantially simultaneously with the radio transmission of the satellite programming. The problem with this solution is that one must employ a personal computer (PC) or other bulky, expensive hardware to receive the Internet programming for which one has already paid a subscription fee to receive via the airways from a satellite. The Internet transmission may sometimes be distributed within an obstructed locality such as a building using a wireless network such as a wireless local area network (WLAN) operating according to an IEEE (Institute of Electrical and Electronic Engineers) Standard 802.11n (where "n" indicates an "a", "b", "g" or later generation 802.11 standard). The problem with such a WLAN solution is that the satellite radio receivers are not equipped to handle signals from the WLAN.

There is a need for an apparatus and method for effecting communication between a wireless network such as a WLAN and a satellite radio receiver.

There is a need for an apparatus and method for effecting communication between a wireless network such as a WLAN and a satellite radio receiver that enables access to a wide area network (WAN) by the satellite radio receiver.

There is a need for an apparatus and method for effecting communication between a wireless network such as a WLAN and a satellite radio receiver that enables access to a WAN such as the Internet by the satellite radio receiver.

SUMMARY OF THE INVENTION

An apparatus for effecting communication between a wireless network and a coupled satellite radio receiver includes: (a) a wireless receiver for receiving at least one local signal associated with the wireless network; (b) a coupler for coupling the satellite radio receiver with the apparatus; and (c) a controller coupled with the wireless receiver and with the coupler. The control unit cooperates with the wireless receiver to ascertain presence of a local signal. The controller cooperates with the wireless receiver and the satellite radio receiver to ascertain whether a satellite signal received by the satellite receiver has a predetermined relationship with the local signal. When the satellite signal has the predetermined relationship with the local signal, the controller and the satellite radio receiver cooperate to provide signaling to the satellite radio receiver using the local signal.

A method for effecting communication between a wireless network and a coupled satellite radio receiver unit includes the steps of: (a) In no particular order: (1) providing a wireless network receiver unit for receiving at least one local signal associated with the wireless network; (2) providing a coupling unit for coupling the coupled satellite radio receiver unit with the apparatus; and (3) providing a control unit coupled with the wireless network receiver unit and with the coupling unit. (b) Operating the control unit and the wireless network receiver unit to cooperate to ascertain presence of the at least one local signal. (c) Operating the control unit, the wireless network receiver unit and, through the coupling unit, the coupled satellite radio receiver to cooperate to ascertain whether at least one satellite signal received by the coupled satellite receiver unit has a predetermined relationship with the at least one local signal. (d) When the at least one satellite signal has the predetermined relationship with the at least one local signal, operating the control unit and the coupled satellite radio receiver unit to cooperate to provide signaling to the coupled satellite radio receiver unit using the at least one local signal.

It is, therefore, an object of the present invention to provide an apparatus and method for effecting communication between wireless network such as a WLAN and a satellite radio receiver.

It is a further object of the present invention to provide an apparatus and method for effecting communication between a wireless network such as a WLAN and a satellite radio receiver that enables access to a wide area network (WAN) by the satellite radio receiver.

It is yet a further object of the present invention to provide an apparatus and method for effecting communication between a wireless network such as a WLAN and a satellite radio receiver that enables access to a WAN such as the Internet by the satellite radio receiver.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
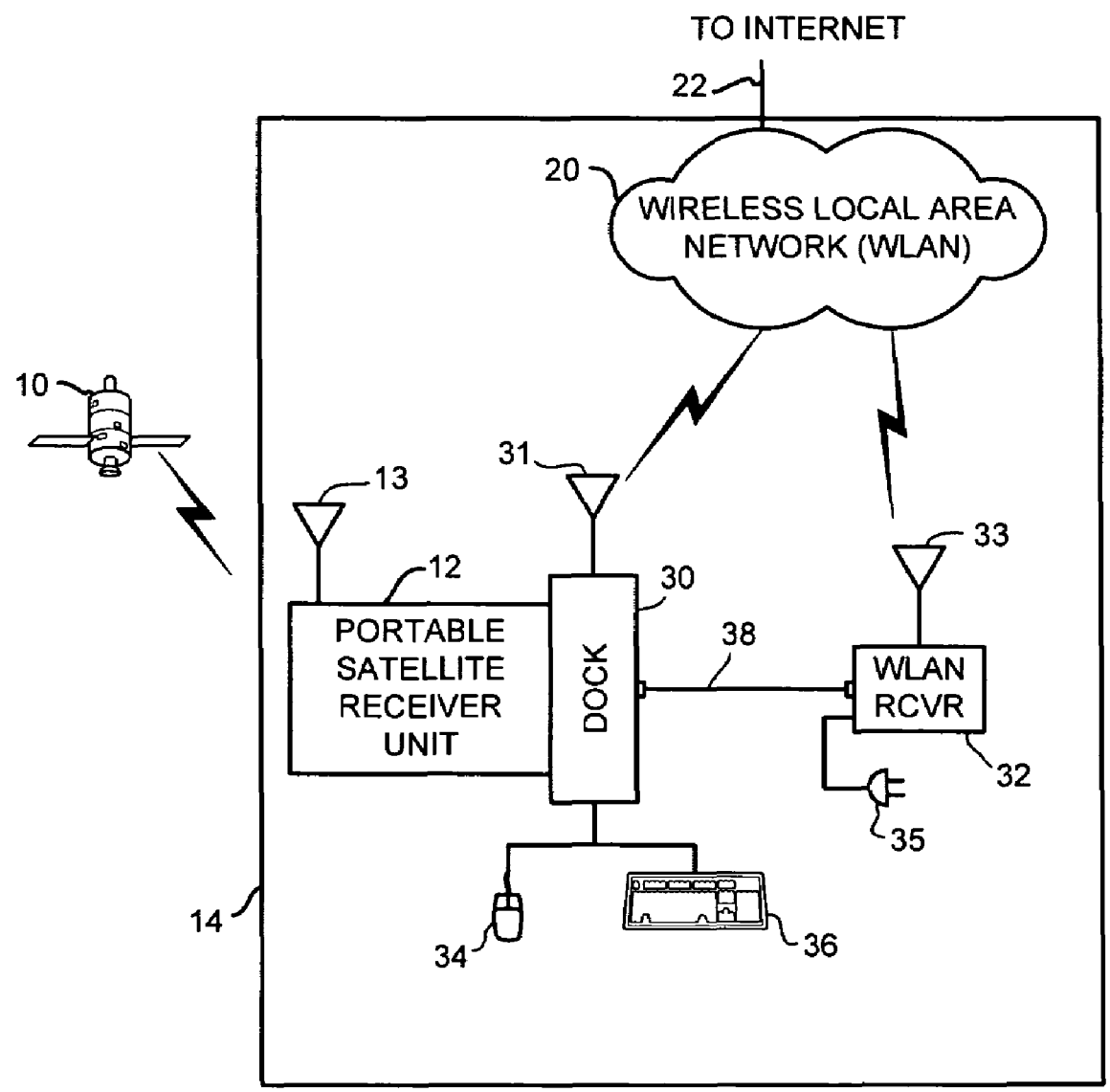
FIG. 1 is a schematic diagram of a representative environment in which the present invention may be advantageously employed.

FIG. 1 is a schematic diagram of a representative environment in which the present invention may be advantageously employed. In FIG. 1, a satellite 10 is configured to transmit satellite radio programming to a satellite radio receiver such as a portable satellite radio receiver unit 12. Portable satellite receiver unit 12 includes an antenna 13 for receiving satellite signals, but is impaired in its reception of signals from satellite 10 because portable satellite receiver unit 12 is situated in an enclosed locality 14. By way of example an not by way of limitation, enclosed locality 14 may be embodied in a home, a store, a coffee shop or another enclosure that impedes reception of satellite transmissions by portable satellite receiver unit 12 of signals originating from satellite 10.

A wireless network 20 is coupled with an external wide area network 22 for distributing connectivity to wide area network (WAN) 22 within enclosed locality 14. By way of example and not by way of limitation, wireless network 20 may be embodied in a WLAN operating according to IEEE Standard 802.11n, and wide area network 22 may be embodied in the Internet.

Portable satellite receiver unit 12 is not configured for operate with wireless network 20. An interface apparatus 30 is configured including an antenna 31 to provide access using WLAN 20 by portable satellite radio unit 12 to satellite programming that is transmitted via WAN 22. It is preferred that satellite programming provided to portable satellite receiver unit 12 by WAN 22 via WLAN 20 be substantially the same programming as is provided by satellite 10 and is substantially simultaneously delivered via WAN 22 via WLAN 20 to portable satellite receiver unit 12 with programming provided by satellite 10.

It is preferred that interface apparatus 30 be configured as a docking unit that can receive portable satellite receiving unit 12 in a physical and electrical connected relation appropriate to effect signal transference to portable satellite receiver unit 12. It is further preferred that interface apparatus 30 be configured to sense presence of signals from WLAN 20 and automatically wirelessly link with WLAN 20. Portable satellite receiver unit 12 and interface apparatus 30 may cooperate to provide required sign-on phraseology to effect connection with satellite programming provided via WAN 22. Such sign-on phraseology may include, by way of example and not by way of limitation, URL address information, user name information and password information identifying portable satellite receiver unit 12 as having an extant subscription-relation with the provider of the satellite programming (not shown in FIG. 1) present on WAN 22. Some sign-on phraseology may be cooperatively provided by one or the other of portable satellite receiver unit 12 and interface apparatus 30. Alternatively, all sign-on phraseology may be provided from one of portable satellite receiver unit 12 and interface apparatus 30 via interface apparatus 30.

Another alternate embodiment contemplates linking interface apparatus 30 with WLAN 20 via a WLAN communication unit wired connection between interface apparatus 30 and a WLAN communication unit 32 having an antenna 33 that is configured for linking with WLAN 22. Wired connection my be effected using any sort of wired connection technology including, by way of example and not by way of limitation, USB (Universal Service Bus) cable 38 wired connection technology. WLAN communication unit 32 may be battery powered or may be powered via an electrical plug 35.

An alternative to one or both of portable satellite receiving unit 12 and interface apparatus 30 automatically providing of required sign-on phraseology to effect connection with satellite programming provided via WAN 22 includes providing an input capability for interface apparatus 30. By way of example and not by way of limitation, such input capability may be established with a mouse input device 34 or a keyboard input device 36. Other exemplary input devices may include joystick devices, 4-way rocker switch input devices (not shown in FIG. 1) and other devices providing communication by a human operator to one or both of portable satellite receiving unit 12 and interface apparatus 30.

Figure 2:
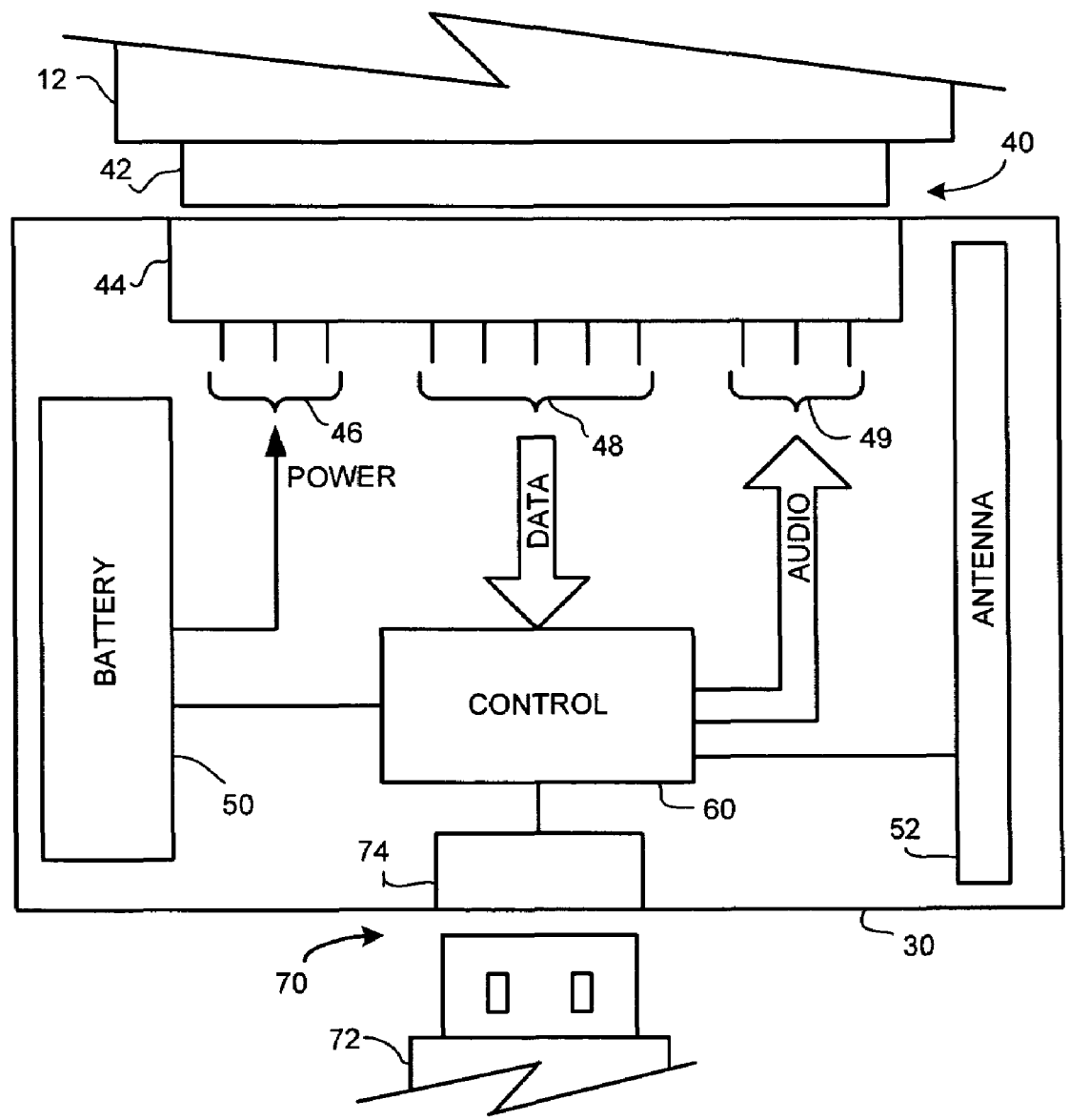
FIG. 2 is a schematic diagram of a preferred embodiment of the apparatus of the present invention.

FIG. 2 is a schematic diagram of a preferred embodiment of the apparatus of the present invention. In FIG. 2, interface apparatus 30 is connected with a portable satellite radio receiver unit 12 in a docking relationship via a connector structure 40. Connector structure 40 includes a first connector portion 42 that may be inserted within a second connector portion 44 for establishing all connections between interface apparatus 30 and portable satellite radio receiver unit 12 that are necessary for operating portable satellite radio receiver unit 12 in a wireless network environment. By way of example and not by way of limitation, power connections 46, data connections 48 and audio connections 49 are effected between interface apparatus 30 and portable satellite radio receiver unit 12 via connector structure 40.

Interface apparatus 30 also includes a power source such as a battery 50, an antenna 52 and a control module 60. Control module 60 is operationally coupled with battery 50 and with antenna 52. Control module 60 is also coupled for providing information to data connections 48 and audio connections 49. Antenna 52 is configured for communication with a wireless local network system such as, by way of example and not by way of limitation, a wireless local area network (WLAN) operating according to an IEEE (Institute of Electrical and Electronic Engineers) Standard 802.11n (where "n" indicates an "a", "b", "g" or later generation 802.11 standard; not shown in FIG. 2).

Control module 60 may also be configured for coupled operation with a local Internet or other WAN interface unit (not shown in FIG. 2) via a USB (Universal Service Bus) connector structure 70. USB connector structure 70 includes a first USB connector portion 72 that may be inserted within a second USB connector portion 74 for establishing all connections between a local Internet or other WAN interface unit and portable satellite radio receiver unit 12 via interface apparatus 30 that are necessary for operating portable satellite radio receiver unit 12 in a wireless network environment.

Interface apparatus 30 and permits portable satellite radio receiver unit 12 to stream-receive and record live satellite programming content provided via a WAN (such as the Internet) using a WLAN or USB interface to the WAN. It is preferred that control module 60 be programmed or otherwise provided with sufficient intelligence to be capable of automatically detecting presence of a WLAN and alert a user of portable satellite receiver unit 12 when a WLAN connection is available (such as in a home, office, coffee shop or similar obstructed locality).

In its USB interface embodiment, interface apparatus 30 preferably provides a wired interface between portable satellite radio unit 12 and a USB port of a WAN interface unit, such as a WLAN receiver 32 (FIG. 1) or similar equipment. In the USB interface embodiment of interface apparatus 30, control module 60 is programmed or otherwise configured to perform an antenna emulator function to translate satellite programming content received from a WAN into a signal format recognizable by portable satellite radio receiver unit 12. By way of example and not by way of limitation, interface apparatus 30 (employing a properly configured control module 60) may operate in a manner similar to a radio transmitter, such as an FM (Frequency Modulated) transmitter to provide an ability to stream-receive any WAN programming through a single station setting on portable satellite radio receiver unit 12. Such an antenna emulator configuration for interface apparatus 30 permits a user to use a portable satellite radio receiver unit 12 in an obstructed locality without need for a local satellite antenna installation.

In its USB embodiment, interface apparatus 30 may receive power via the USB connection and may provide power to portable satellite radio receiver unit 12 from the USB connection rather than from battery 50. Interface apparatus 30 may also provide charging current from the USB connection for a battery (not shown in FIG. 2) contained within portable satellite radio receiver unit 12.

Figure 3:
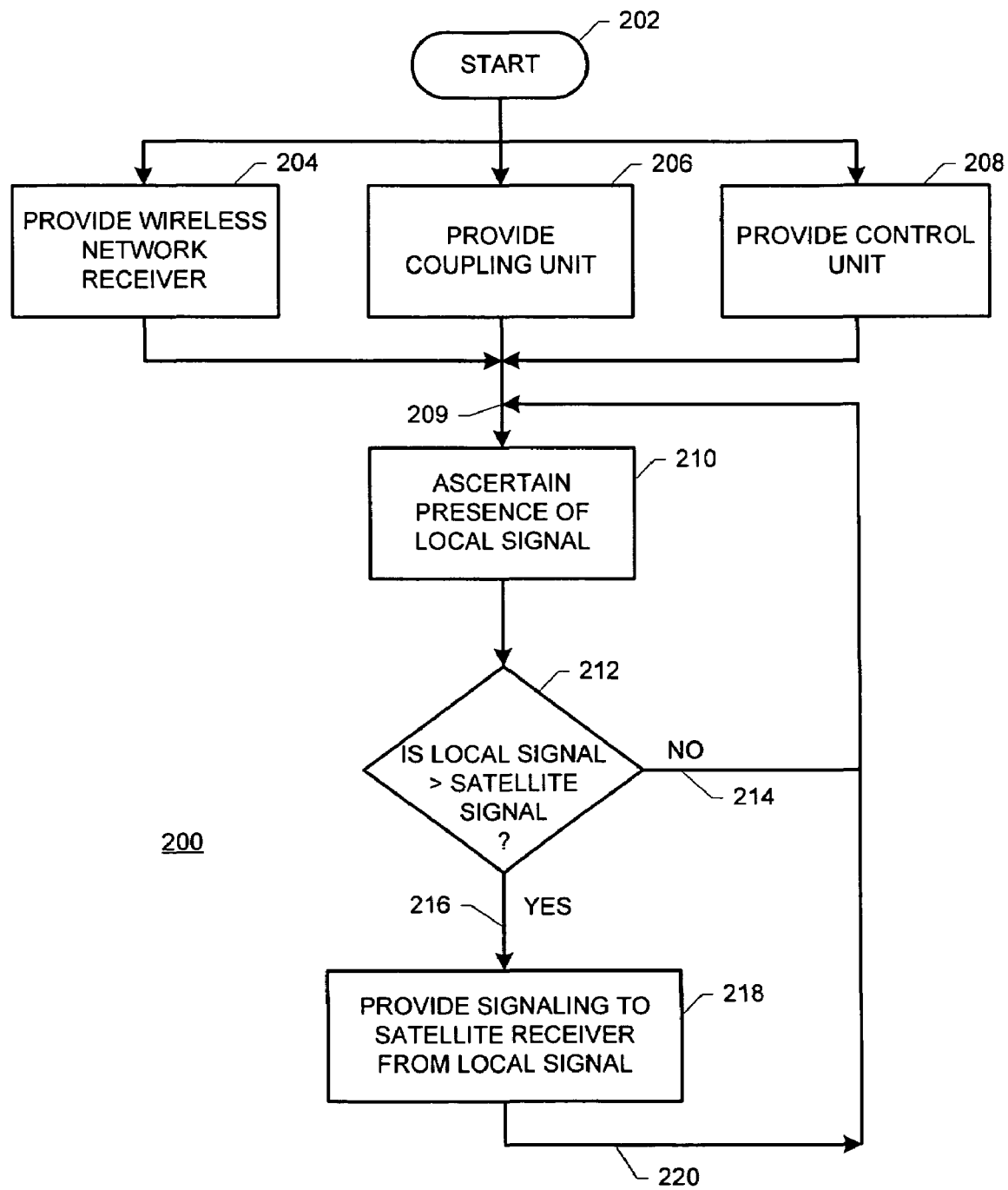
FIG. 3 is a flow diagram illustrating the method of the present invention.

FIG. 3 is a flow diagram illustrating the method of the present invention. In FIG. 3, a method 200 for effecting communication between a wireless network and a coupled satellite radio receiver unit begins at a START locus 202. Method 200 continues with the step of, in no particular order, (1) providing a wireless network receiver unit for receiving at least one local signal associated with the wireless network, as indicated by a block 204; (2) providing a coupling unit for coupling the coupled satellite radio receiver unit with the apparatus, as indicated by a block 206; and (3) providing a control unit coupled with the wireless network receiver unit and with the coupling unit, as indicated by a block 208.

Method 200 continues with the step of operating the control unit and the wireless network receiver unit to cooperate to ascertain presence of the at least one local signal, as indicated by a block 210. Method 200 continues with the step of operating the control unit, the wireless network receiver unit and, through the coupling unit, the coupled satellite radio receiver to cooperate to ascertain whether at least one satellite signal received by the coupled satellite receiver unit has a predetermined relationship with the at least one local signal, as indicated by a query block 212.

If the at least one satellite signal does not have the predetermined relationship with the at least one local signal, method 200 proceeds via NO response line 214 to return to juncture 209 and repeat the steps represented by blocks 210, 212. If the at least one satellite signal does have the predetermined relationship with the at least one local signal, method 200 proceeds via YES response line 216 to operate the control unit and the coupled satellite radio receiver unit to cooperate to provide signaling to the coupled satellite radio receiver unit using the at least one local signal, as indicated by a block 218. Method 200 returns to juncture 209 to continue monitoring satellite signals and local signals in performing steps represented by blocks 210, 212, 218.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. An apparatus for effecting communication between a wireless network and a coupled satellite radio receiver unit; the apparatus comprising:
   (a) a wireless network receiver unit for receiving at least one local signal associated with said wireless network;
   (b) a coupling unit for coupling said coupled satellite radio receiver unit with the apparatus; and
   (c) a control unit coupled with said wireless network receiver unit and with said coupling unit;
said control unit cooperating with said wireless network receiver unit to ascertain presence of said at least one local signal; said control unit cooperating with said wireless network receiver unit and cooperating through said coupling unit with said coupled satellite radio receiver to compare said at least one local signal with at least one satellite signal received by said coupled satellite receiver unit to ascertain whether said at least one satellite signal has a predetermined relationship with said at least one local signal; when said at least one satellite signal has said predetermined relationship with said at least one local signal, said control unit and said coupled satellite radio receiver unit cooperating to provide signaling to said coupled satellite radio receiver unit using said at least one local signal.

2. An apparatus for effecting communication between a wireless network and a coupled satellite radio receiver unit as recited in claim 1 wherein said at least one local signal conveys local programming material substantially similar to satellite programming material conveyed by said at least one received satellite signal.

3. An apparatus for effecting communication between a wireless network and a coupled satellite radio receiver unit as recited in claim 2 wherein said local programming material is broadcast substantially simultaneously with said satellite programming material.

4. An apparatus for effecting communication between a wireless network and a coupled satellite radio receiver unit as recited in claim 1 wherein said wireless network is coupled with a wide area network.

5. An apparatus for effecting communication between a wireless network and a coupled satellite radio receiver unit as recited in claim 4 wherein said at least one local signal conveys local programming material substantially similar to satellite programming material conveyed by said at least one received satellite signal.

6. An apparatus for effecting communication between a wireless network and a coupled satellite radio receiver unit as recited in claim 5 wherein said local programming material is broadcast substantially simultaneously with said satellite programming material.

7. An apparatus for effecting communication between a wireless network and a coupled satellite radio receiver unit as recited in claim 5 wherein said local programming material is received by said wireless network from said wide area network.

8. An apparatus for effecting communication between a wireless network and a coupled satellite radio receiver unit as recited in claim 7 wherein said local programming material and said satellite programming material originate from a common source.

9. An apparatus for effecting communication between a wireless network and a coupled satellite radio receiver unit as recited in claim 8 wherein said wide area network is the Internet.

10. An apparatus for effecting communication between a wireless network and a coupled satellite radio receiver unit as recited in claim 9 wherein said control unit includes a memory storage unit; said memory storage unit containing at least one sign-on phrase for use by said control unit for accessing said local programming material via the Internet.

11. An apparatus for effecting communication between a wireless network and a coupled satellite radio receiver unit as recited in claim 4 wherein said control unit includes a memory storage unit; said memory storage unit containing at least one sign-on phrase for use by said control unit for accessing said local programming material via said wide area network.

12. An apparatus for effecting communication between a coupled satellite radio receiver unit and a wireless network link to at least one wide area network; said at least one wide area network carrying information from an originator of programming for reception by said coupled satellite radio receiver; the apparatus comprising:

(a) a wireless network receiver unit for receiving said information via at least one local signal associated with said wireless network link;
(b) a coupling unit for coupling said coupled satellite radio receiver unit with the apparatus;
(c) a control unit coupled with said wireless network receiver unit and with said coupling unit;
said control unit cooperating with said wireless network receiver unit to ascertain presence of said at least one local signal; said control unit cooperating with said wireless network receiver unit and cooperating through said coupling unit with said coupled satellite radio receiver to compare said at least one local signal with at least one satellite signal received by said coupled satellite receiver unit to ascertain whether said at least one satellite signal has a predetermined relationship with said at least one local signal; when said at least one satellite signal has said predetermined relationship with said at least one local signal, said control unit and said coupled satellite radio receiver unit cooperating to provide programming signaling to said coupled satellite radio receiver unit using said at least one local signal.

13. An apparatus for effecting communication between a coupled satellite radio receiver unit and a wireless network link to at least one wide area network as recited in claim 12 wherein said local programming material is broadcast substantially simultaneously with said satellite programming material.

14. An apparatus for effecting communication between a coupled satellite radio receiver unit and a wireless network link to at least one wide area network as recited in claim 13 wherein said wide area network is the Internet.

15. An apparatus for effecting communication between a coupled satellite radio receiver unit and a wireless network link to at least one wide area network as recited in claim 14 wherein said control unit includes a memory storage unit; said memory storage unit containing at least one sign-on phrase for use by said control unit for accessing said local programming material via the Internet.

16. An apparatus for effecting communication between a coupled satellite radio receiver unit and a wireless network link to at least one wide area network as recited in claim 12 wherein said control unit includes a memory storage unit; said memory storage unit containing at least one sign-on phrase for use by said control unit for accessing said local programming material via said wide area network.

17. A method for effecting communication between a wireless network and a coupled satellite radio receiver unit; the method comprising the steps of:

(a) in no particular order:
  (1) providing a wireless network receiver unit for receiving at least one local signal associated with said wireless network;
  (2) providing a coupling unit for coupling said coupled satellite radio receiver unit with the apparatus; and
  (3) providing a control unit coupled with said wireless network receiver unit and with said coupling unit;
(b) operating said control unit and said wireless network receiver unit to cooperate to ascertain presence of said at least one local signal;
(c) operating said control unit, said wireless network receiver unit and, through said coupling unit, said coupled satellite radio receiver to cooperate to compare said at least one local signal with at least one satellite signal received by said coupled satellite receiver unit to ascertain whether said at least one satellite signal has a predetermined relationship with said at least one local signal; and
(d) when said at least one satellite signal has said predetermined relationship with said at least one local signal, operating said control unit and said coupled satellite radio receiver unit to cooperate to provide signaling to said coupled satellite radio receiver unit using said at least one local signal.

18. A method for effecting communication between a wireless network and a coupled satellite radio receiver unit as recited in claim 17 wherein said wireless network is coupled with a wide area network.

19. A method for effecting communication between a wireless network and a coupled satellite radio receiver unit as recited in claim 18 wherein said at least one local signal conveys local programming material substantially similar to satellite programming material conveyed by said at least one received satellite signal; said local programming and said satellite programming occurring substantially simultaneously.

20. A method for effecting communication between a wireless network and a coupled satellite radio receiver unit as recited in claim 19 wherein said control unit includes a memory storage unit; said memory storage unit containing at least one sign-on phrase for use by said control unit for accessing said local programming material via said wide area network.

* * * * *